United States Patent
Liberman et al.

(10) Patent No.: US 7,591,139 B2
(45) Date of Patent: Sep. 22, 2009

(54) METHOD FOR ENSURING THE USE OF BRINE WITH AN OPTIMAL COMPOSITION

(75) Inventors: Barnet Liberman, New York, NY (US); Kevin Charles Vandervoort, Suffield, CT (US); Andrew M. Preissner, Suffield, CT (US)

(73) Assignee: Winterlab Limited, New York, NY (US)

( * ) Notice: Subject to any disclaimer, the term of this patent is extended or adjusted under 35 U.S.C. 154(b) by 309 days.

(21) Appl. No.: 11/707,595

(22) Filed: Feb. 16, 2007

(65) Prior Publication Data

US 2008/0199583 A1   Aug. 21, 2008

(51) Int. Cl.
  *F25D 17/02*   (2006.01)
(52) U.S. Cl. .................. 62/64; 62/125; 62/373
(58) Field of Classification Search ............ 62/64, 62/78, 125, 373; 257/67
  See application file for complete search history.

(56) References Cited

U.S. PATENT DOCUMENTS

| | | | |
|---|---|---|---|
| 4,601,909 A | 7/1986 | Nagoshi | |
| 4,654,217 A | 3/1987 | Nagoshi | |
| 4,657,768 A | 4/1987 | Nagoshi | |
| 4,689,963 A | 9/1987 | Sakai | |
| 4,743,343 A | 5/1988 | Sakai | |
| 4,840,034 A | 6/1989 | Liberman et al. | |
| 4,840,035 A | 6/1989 | Liberman et al. | |
| 5,001,047 A | 3/1991 | Liberman | |
| 5,222,367 A * | 6/1993 | Yamada | 62/64 |
| 6,248,381 B1 | 6/2001 | Lieberman et al. | |
| 7,022,360 B2 | 4/2006 | Liberman et al. | |
| 2005/0089837 A1* | 4/2005 | Liberman et al. | 435/2 |
| 2005/0166664 A1 | 8/2005 | Lieberman et al. | |

* cited by examiner

*Primary Examiner*—Melvin Jones
(74) *Attorney, Agent, or Firm*—Cohen Pontani Lieberman & Pavane LLP

(57) ABSTRACT

A method of freezing with brine comprising releasing at least one ingredient in an effective amount from an automated device into the brine so that the brine is rendered unusable for its intended purpose, thereby ensuring that the brine is used only in a optimal composition.

17 Claims, No Drawings

METHOD FOR ENSURING THE USE OF BRINE WITH AN OPTIMAL COMPOSITION

BACKGROUND OF THE INVENTION

1. Field of the Invention

The present invention relates to a method of freezing, in particular to method of ensuring the use of brine with optimal composition for freezing various food products and biological samples.

2. Description of the Related Art

Methods of freezing food products for long duration preservation and freezing biological samples for cytological or histological examination are known and available. For example, liquid nitrogen is a conventional method for freezing food or biological samples. Nevertheless, this method is costly since the liquid nitrogen is expensive.

Using cooled brine (antifreeze solution) is another conventional freezing method. Brine includes inorganic substances such as calcium chloride, and organic substances such as ethylene glycol and propylene glycol. This method is advantageous, because it achieves greater cooling at a comparatively lower price.

For example, "A Method of Freezing Fishery Products" is known from U.S. Pat. No. 4,601,909 issued to Nagoshi on Jul. 22, 1986. This method includes the steps of preparing a brine containing rapeseed oil, propylene glycol, calcium chloride and water, cooling the brine and immersing the seafood in the cooled brine until it is frozen. This method reduces or eliminates breakdown of muscle tissue in the seafood. Hence, deterioration in quality of the frozen product is prevented or reduced.

A similar process for "Quick Freezing of Meat" is disclosed and claimed in U.S. Pat. No. 4,654,217 issued to Nagoshi on Mar. 31, 1987. The disclosed process is similar to that disclosed in U.S. Pat. No. 4,601,909 except that it is applicable to beef, poultry, pork and the like.

U.S. Pat. No. 4,657,768 issued to Nagoshi on Apr. 14, 1987, discloses a "Freezing Method for Perishable Foods" which includes placing a perishable food in a heat conducting container and causing the other surface of the heat conducting container to contact cooled brine or a liquefied gas. Accordingly, the perishable food is frozen quickly without immersion.

U.S. Pat. No. 4,689,963 issued to Sakai on Sep. 1, 1987, relates to a method of freezing foods. The method of Sakai is similar to the methods of Nagoshi except that a layer of brine is placed in the heat conducting container along with the perishable food. Freezing proceeds only from the portion which is in contact with the brine and the potential for the food to stick to the container is reduced.

U.S. Pat. No. 7,022,360 issued to Liberman et al. provides an improved method of marinating and reconstituting meat from trims of fish, poultry, pork, beef or the like. The method comprises the steps of freezing the trims, adding marinade to the frozen trims and compressing the frozen trims to a sufficient pressure to lower the freezing point below the temperature of the frozen trims such that the marinade is diffused through the trims and purge is formed on the outer surface of the trims so as to hold the trims together.

U.S. Pat. No. 4,840,034 issued to Liberman provides a method of freezing vital body fluids for storage. The method includes the steps of preparing a brine including a cruciferous oil, cooling the brine, providing a heat transfer container having a vital body fluid therein and subjecting the heat transfer container to a heat transfer relationship with the cooled brine for a period of time sufficient to freeze the vital body fluid in the heat transfer container.

U.S. Pat. No. 4,840,035 issued to Liberman et al. provides a method of freezing a tissue specimen by using a brine comprising a cruciferous oil.

U.S. Pat. No. 5,001,047 issued to Liberman provides a method of preserving harvested viable organs for transplant. The method includes the steps of preparing a brine including a cruciferous oil and a glycol, cooling the brine, and subjecting the harvested viable organ to the cooled brine in order to chill the viable organ and maintain its viability.

All of the above cited references are herein incorporated by reference in their entireties.

According to the above cited references, maintaining the composition of a brine in a desired balance, i.e., with each ingredient contained therein being in a predetermined proportion, is very important for attaining desirable results, e.g., minimization of weight loss and deterioration of the taste of a food product, reduction of damage to the muscular tissue of a meat product or a tissue sample, and maintenance of the viability of vital body fluids such as sperm, eggs, zygotes, blood and the like over an extended period of time.

As a brine, in which each component is in a predetermined proportion, is used over time the brine becomes gradually "out of balance", i.e., at least one component may not be in the predetermined proportion, due to, e.g., different rates of evaporation. Many brine formulations are naturally hydroscopic and when they absorb moisture from the surrounding atmosphere go "out of balance." In other words, the proportion and amount of brine ingredients with respect to each other will no longer be at optimal levels. There is also the possibility that the brine may be gradually contaminated. The total amount of brine may also be reduced to a sub-optimal amount after being used over time. As a general practice, brine suppliers often specify or recommend that brine, after being used for a certain period of time, should be replaced with a certified balanced new brine. Because the brine typically gradually degrades, the physical change of the brine based on the brine's appearance is not dynamic. Thus, users tend to ignore the supplier's recommendation to replace the brine and continue using the brine after it expires. The quality of the frozen product or sample so frozen, freezing efficiency, and/or operating cost is, therefore, significantly compromised.

Therefore, there is a need for a method of ensuring that a brine for freezing is used in an optimal composition, and the brine, upon being "out of balance", is timely replaced, in particular for the application of brine in food or medical industry.

SUMMARY OF THE INVENTION

The present invention provides a method of freezing by:

a) preparing a brine composition comprising a plurality of components, with each component being in a predetermined proportion;

b) cooling the brine composition to a predetermined temperature;

c) placing an item to be frozen in a heat transfer relationship with the cooled brine for a period of time to sufficiently freeze the item;

d) removing the frozen item for storage or further use;

e) repeating the steps b)-d) for a predetermined duration or a predetermined number of times;

f) automatically releasing at least one ingredient in an effective amount from an automated device into the brine composition so that the use of the brine composition is discontinued; and g) repeating steps a)-f).

The various features of novelty which characterize the invention are pointed out with particularity in the claims annexed to and forming a part of the disclosure. For a better understanding of the invention, its operating advantages, and specific objects attained by its use, reference should be had to the described preferred embodiments of the invention.

DETAILED DESCRIPTION OF THE PRESENTLY PREFERRED EMBODIMENTS

As used herein, the term "item" means anything that is suitable for being frozen through immersion in brine, which includes food and/or a biological sample. The food may be meat, seafood, vegetables, or fruit. The biological sample may be tissue, stem cells, sperms, fertilized eggs, unfertilized eggs, an animal organ, or the like.

In accordance with one embodiment of the present invention, the at least one ingredient, upon being released to the brine, makes the brine practically unusable for a satisfactory, or even compromised freezing process. Preferably, the at least one ingredient is released from an automated device and is one of the plurality of components of the brine composition. For example, the ingredient to be released from the automated device may be propylene glycol.

In accordance with another embodiment of the present invention, the at least one ingredient released from the automated device may be a dye which, upon being released to the brine composition in an effective amount, creates a visual indication that the brine should be replaced with a new brine as soon as possible. Preferably, the dye, upon being released to the brine, confers a distinctive color to the brine. The dye may be used in an amount of from 0.000005 to 0.00004, preferably from 0.00001 to 0.00002, more preferably about 0.00001 weight percent of the brine composition. Preferably, the dye is water soluble. Examples of the dye suitable in the present invention include:

1) Bright Dyes® Blue, Yellow/Green, 1 GALLON TREATS 100,000 GALLONS OF WATER;
2) TRUE BLUE™, 5.25 OUNCE TREATS 325,000 GALLONS OF WATER;
3) Neelikon Food Dyes: Neeligran FD&C Yellow 5, Neeligran FD&C Yellow 6, Neeligran FD&C Red 40, Neeligran FD&C Red 3, Neeligran FD&C Blue 2, Neeligran FD&C Blue 1, and Neeligran FD&C Green 3; and
4) COLOREZE™ FD&C Yellow 5, FD&C Yellow 6, FD&C Red 40, FD&C Red 3, FD&C Blue 2, FD&C Blue 1, and FD&C Green 3.

Preferably, the dye is a food grade FDA approved dye, with a distinctive color such as blue. One preferable dye suitable used in the present invention is Bright Dyes® Standard Blue™ liquid concentrate manufactured by Kingscote Chemicals, Inc. of Ohio.

The predetermined duration of using a brine may be from 7 days to 3 months. The automated device may be installed with a timer which triggers the release of the at least one ingredient when the predetermined duration expires.

Instead of, or in addition to, the ingredient being administered to the brine as a time-based criteria, the ingredient may be released from an automated device on a use-based criteria, i.e. after a predetermined number of uses of the brine. The times of using the brine are equal to the times of cooling the brine prior to freezing the item. The information as to how many times that the brine is cooled may be collected by a sensor placed in the brine and conveyed to the automated device. When the predetermined number of the uses of the brine composition expires, the automated device is then activated to release the at least one ingredient into the brine. Preferably, the predetermined number of uses is from 7 to 100.

The automated device can be any suitable device, including those described in the prior art. For example, the automated device may include a set of cartridges which hold enough of a concentrate of one of the brine components, e.g., propylene glycol, which is released by a timer into the brine at a predetermined interval. The cartridges may be replaced, and the timer may be reset at the time of replacing the old brine with a new brine.

The brine composition can be any composition suitable for freezing an item, such as any of the brine solutions disclosed in U.S. Pat. Nos. 4,601,909; 4,654,217; 4,657,768; 4,689,963; 4,743,343; 4,840,034; 4,840,035; 5,001,047; and 6,248,381, the contents of which patents are incorporated herein by reference in their entireties.

Preferably, the brine comprises at least about 0.005% by weight of cruciferous oil. More preferably, about 0.005% to 0.018% by weight of cruciferous oil such as rapeseed oil may be used. Alternatively, the amount of cruciferous oil may be selected such that a maximum amount of the oil is dissolved in the brine.

The brine composition preferably comprises propylene glycol and water. It is also preferable that the brine composition contains calcium chloride. The water used in the composition is preferably deionized before being added into the brine composition.

In accordance with one embodiment of the present invention, the brine composition in a desired balance comprises about 0.01% by weight of rapeseed oil, about 43.18% by weight of water, about 44.06% by weight of propylene glycol, and about 12.75% by weight of calcium chloride.

In accordance with one embodiment of the present invention, the brine may be cooled to a predetermined temperature of below about −20° C., preferably −30° C. to about 43° C., and more preferably about −38° C. to −40° C.

The gravity of the brine composition may be periodically measured to determine whether the brine composition is "out of balance".

The brine used in the present invention may be a color brine containing a dye, which may be added either during the preparation of the brine or after the brine is prepared but before the brine is used for freezing. Thus, the color of the brine composition may be periodically observed or recorded at least one temperature to determine whether the brine composition is "out of balance" in reference to the color of a standard brine composition in a desired balance at the same temperature.

A pre-established correlation of color may be established to show different colors of a brine composition of a desired balance and other compositions that deviate from the desired balance. In the composition of the desired balance, each ingredient contained therein has a desired amount. In other compositions, at least one ingredient is in an amount that deviates from the desired amount. The amount of the ingredient may be in volume, weight, or ratio of one ingredient to other ingredient contained in the brine composition. For example, the amount of the ingredient may be in a weight percentage of the total amount of the brine composition. The amount of the ingredient may be expressed by the deviation degree from the desired amount. The pre-established correlation may optionally be established with respect to only one or more important ingredients instead of all the ingredients contained in the brine composition.

The pre-established correlation of color and brine composition may be shown in a standard color chart. For example, a color wheel guide may be devised to establish the perfect balance color at different temperatures, such as from −20° C. to 42° C., preferably from −34° C. to 40° C. Thus, if the color of a brine solution later used does not match the color at the corresponding temperature in the color wheel, it indicates that the brine solution does not have the desired composition balance. Then a further full analysis of the brine solution, such as specific gravity, may need to be performed. U.S. Patent Application Publication No. 2005/0166664 discloses a method for determining whether a brine composition is in a desired balance based on the color of the brine. The entire content of U.S. Patent Application Publication No. 2005/0166664 is hereby incorporated as reference.

The freezer may also be equipped with a device to read the color of the brine at a predetermined temperature and upon determining that the brine is "out of balance", the device automatically shuts down the freezer until the brine being used is replaced with a new brine.

After determining that a brine is "out of balance", the brine may then be drained and replaced with a certified balanced brine mixture. The drained brine mixture may be returned to the supplier for rebalancing and/or purification.

Thus, while there have shown and described and pointed out fundamental novel features of the invention as applied to a preferred embodiment thereof, it will be understood that various omissions and substitutions and changes in the form and details of the method illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method of freezing comprising:
   a) preparing a brine composition comprising a plurality of components, with each of the components being in a predetermined proportion;
   b) cooling the brine composition to a predetermined temperature;
   c) placing an item to be frozen in a heat transfer relationship with the cooled brine for a period of time to sufficiently freeze the item;
   d) removing the frozen item for storage or further use;
   e) repeating the steps b)-d) for a predetermined duration or a predetermined number of times;
   f) automatically releasing at least one ingredient in an effective amount from an automated device into the brine composition so that the use of the brine composition is discontinued; and
   g) repeating steps a)-f).

2. The method of claim 1 wherein the at least one ingredient released from the automated device is one of the plurality of components of the brine.

3. The method of claim 1 wherein the at least one ingredient released from the automated device is a dye which, upon being released to the brine composition, substantially changes the color of the brine composition.

4. The method of claim 1 wherein the brine composition comprises at least about 0.005% by weight of a cruciferous oil.

5. The method of claim 4 wherein the brine composition further comprises at least one of water, propylene glycol and calcium chloride.

6. The method of claim 1 wherein the brine comprises about 0.01% rapeseed oil about 43.18% water, about 44.06% propylene glycol, and about 12.15% calcium chloride.

7. The method of claim 1 wherein the at least one ingredient released from the automated device is propylene glycol.

8. The method of claim 1 wherein the predetermined temperature is below about −20° C.

9. The method of claim 1 wherein the predetermined temperature is from −30° C. to about −43° C.

10. The method of claim 1 wherein the predetermined temperature is from about −38° C. to −40° C.

11. The method of claim 1 wherein the item to be frozen is selected from the group consisting of a food and a biological sample.

12. The method of claim 11 wherein the food is selected from the group consisting of meat, seafood, fruit, vegetable, and combinations thereof.

13. The method of claim 11 wherein the biological sample is selected from the group consisting of tissue, stem cells, fertilized eggs and unfertilized eggs, an animal organ, and combinations thereof.

14. The method of claim 1 further comprising a step of measuring the gravity of the brine composition to determine whether at least one component of the brine composition is not in the predetermined proportion.

15. The method of claim 1 wherein the brine is a colored brine comprising an effective amount of dye, the color of the colored brine changes with the change of the composition of the colored brine, and the method further comprises a step of comparing the color of the colored brine used in any of steps b)-f) to the color of the colored brine prepared in step a) at the same temperature to determine whether at least one component of the colored brine is not in the predetermined proportion.

16. The method of claim 1 wherein the predetermined duration of step e) is from 7 days to 3 months.

17. The method of claim 1 wherein the predetermined number of times is from 7 to 100.

* * * * *